United States Patent [19]
Yoshida et al.

[11] Patent Number: 5,926,492
[45] Date of Patent: Jul. 20, 1999

[54] LASER PULSE OSCILLATOR

[75] Inventors: Eiji Yoshida; Masataka Nakazawa, both of Mito, Japan

[73] Assignee: Nippon Telegraph & Telephone Corporation, Tokyo, Japan

[21] Appl. No.: 08/919,354

[22] Filed: Aug. 28, 1997

[30] Foreign Application Priority Data

Sep. 2, 1996 [JP] Japan ................................ 8-232074

[51] Int. Cl.$^6$ .............................. H01S 3/07; H01S 3/098; H01S 3/10
[52] U.S. Cl. .................................. 372/6; 372/18; 372/26; 372/25
[58] Field of Search ................................... 372/6, 18, 25, 372/26, 29, 31

[56] References Cited

U.S. PATENT DOCUMENTS 5,583,959  12/1996  Nakazawa et al. ...................... 372/6

FOREIGN PATENT DOCUMENTS 8-18139  1/1996  Japan .
9-139536  5/1997  Japan .

OTHER PUBLICATIONS

Extended Abstracts (The 43rd Spring Meeting 1996); The Japan Society of Applied Physics and Related Societies—No. 3; 26a–A–7; NTT Access Network Systems Labs. M. Nakazawa et al.; Mar. 26, 1996.

Ultrahigh Speed Optical Pulse Generator; Feature & Configuration (No date).

A Repetition–Rate Stabilized and Tunable, Regeneratively Mode–Locked Fiber Laser Using an Offset–Locking, Technique; Nakazawa et al., Jpn. J. Appl. Phys. vol. 35 (1996); Part 2, No. 6A, Jun. 1, 1996; pp. L691–694.

*Primary Examiner*—James W. Davie
*Attorney, Agent, or Firm*—Venable; Robert J. Frank

[57] ABSTRACT

A harmonically and regeneratively mode-locked laser pulse oscillator having a clock extraction circuit for picking up from a fragment of a laser output a clock signal corresponding to a high-order integer multiple of the fundamental frequency determined by the cavity length of the laser, a phase shifter and an electric amplifier for driving an optical modulator disposed in the laser cavity at the frequency of the clock signal. The laser pulse oscillator has a phase-locked loop including a phase comparator for detecting the phase difference between the clock signal and an external signal fed from a synthesizer with its frequency fixed, a fiber stretcher for controlling the cavity length such that the repetition rate frequency of the laser pulse oscillator is locked to the external signal, and an electric filter and electric amplifier for expanding and contracting the fiber length by feeding back the phase difference detected by the phase comparator to the fiber stretcher. This makes it possible to lock the repetition rate frequency of the optical pulse train to the external signal, and to generate the stabilized, fixed frequency optical pulse train with a high repetition rate over a long time period.

14 Claims, 7 Drawing Sheets

LASER PULSE OSCILLATOR

BACKGROUND OF THE INVENTION

1. Field of the Invention

The present invention relates to a laser pulse oscillator for achieving stable oscillation of short pulses with a high repetition rate which are needed for implementing ultrafast optical communication systems, and particularly to a harmonically and regeneratively mode-locked laser pulse oscillator from which is extracted from an output fragment of the laser a clock signal with a frequency of a high-order integer multiple of the fundamental frequency determined by the cavity length of the laser, and which drives at the frequency of the clock signal an optical modulator incorporated in the laser cavity.

2. Description of Related Art

To implement future ultrafast optical communications, a stabilized optical source for generating short pulses with a high repetition rate is expected to play an important role. As a technique for generating picosecond pulse trains in the GHz region, a method of mode-locking a semiconductor laser or that of a fiber laser is known. Although the semiconductor laser is smaller, the fiber laser is superior to the semiconductor laser in the quality of the output pulse (which means transform limited short pulses). However, since the fiber laser has a longer cavity length, it is susceptible to change in temperature, and this makes it difficult to obtain stable operation over a long period of time. This problem has already been solved in part by employing a regenerative mode-locking technique which extracts a clock signal from the output of the laser, and drives a modulator by the clock signal.

Figure 1:
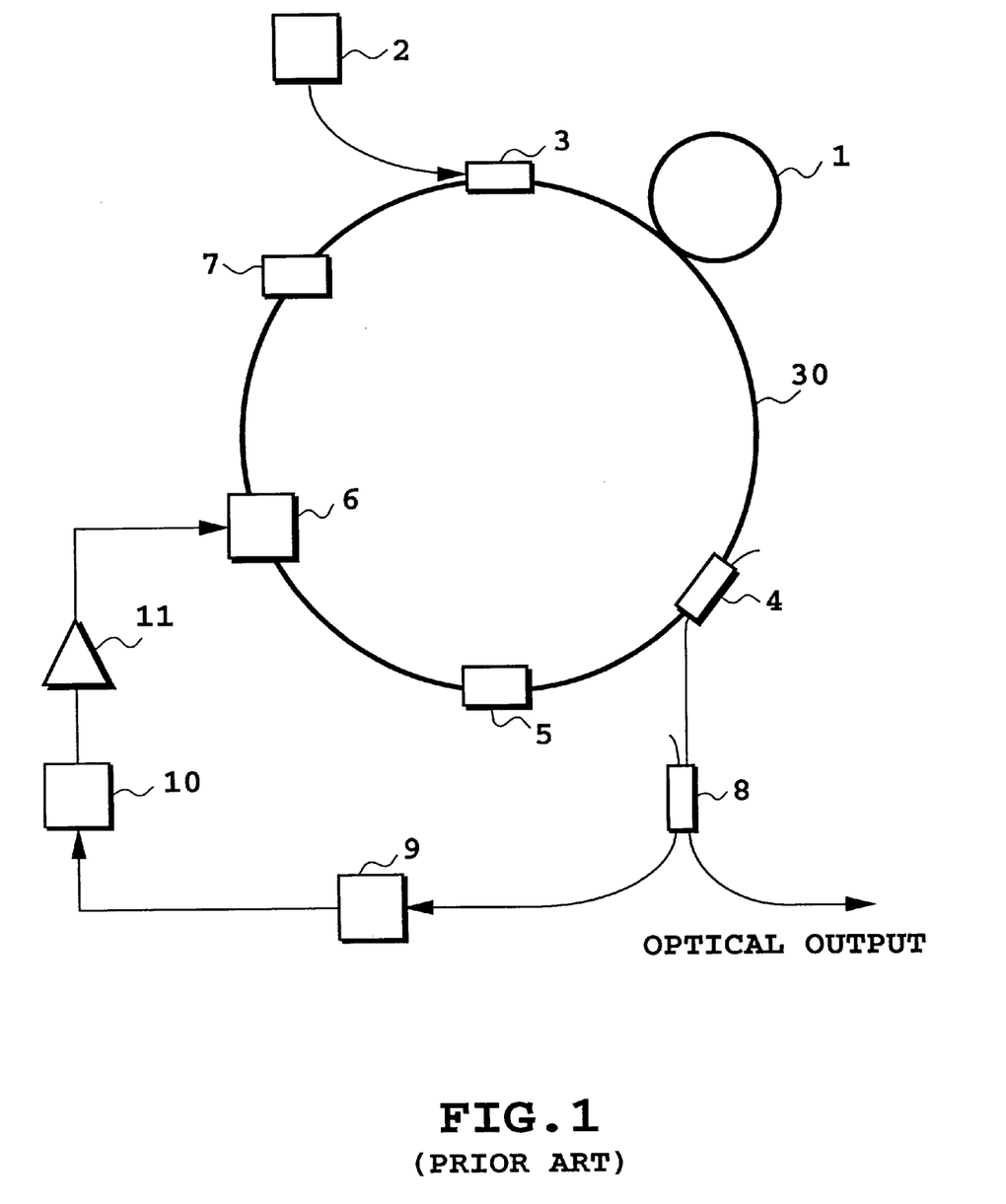
FIG. 1 is a block diagram showing a setup of a conventional laser pulse oscillator.

FIG. 1 shows a setup of a conventional laser pulse oscillator using a mode-locked optical fiber laser, which is disclosed in laid-open Japanese Patent Application No. 18139/1996. In this figure, the reference numeral 1 designates a rare-earth doped optical fiber, 2 designates a pumping light source for pumping the rare-earth doped optical fiber 1, 3 designates an optical coupler for coupling the pumping light to the rare-earth doped optical fiber 1, 4 designates an optical coupler, 5 designates an optical isolator for confining the traveling direction of the light in a single direction, 6 designates an optical modulator, 7 designates an optical filter, 8 designates an optical coupler, 9 designates a clock extraction circuit, 10 designates a phase shifter, 11 designates an electric amplifier, and 30 designates an optical fiber loop constituting the laser pulse oscillator by linking the elements 1, 3, 4, 5, 6 and 7.

In the laser pulse oscillator as shown in FIG. 1, an optical pulse train with a high repetition rate is generated as follows. Pumping the rare-earth doped optical fiber 1 by the pumping light source 2 through the optical coupler 3 causes continuous wave light to be oscillated in the forward direction of the optical isolator 5 within the passband of the optical filter 7. The laser output is extracted through the optical coupler 4 and split by the optical coupler 8 so that a fragment of the laser output is input to the clock extraction circuit 9 which includes a photo detector, a narrow-band electric filter and an electric amplifier. The clock extraction circuit 9 extracts from the fragment of the laser output a sinusoidal clock signal with a particular frequency corresponding to a high-order integer multiple of a fundamental frequency determined by the cavity length of the laser. The clock signal undergoes phase adjustment through the phase shifter 10, is amplified by the electric amplifier 11, and applied to the optical modulator 6. Thus, intensity modulation of the light is carried out in the cavity at a frequency locked to the clock signal.

Generally speaking, the mode-locking in the fundamental cavity mode can be achieved by amplitude modulation at a fundamental frequency of $f_0=c/(nL)$ determined by the cavity length, where L is the cavity length, n is the refractive index of the optical fiber, and c is the traveling speed of the light. Besides, the harmonic mode-locking at a frequency of q times the fundamental cavity mode can be obtained by setting the modulation frequency f at $f=qf_0=qc/(nL)$, q times the fundamental frequency $f_0$ determined by the cavity length L of the laser, where q is an integer. In other words, q optical pulses are generated at equal intervals in the cavity of the laser, producing an optical pulse train at the repetition-rate frequency of $qf_0$.

Let us consider a case of employing a clock extraction circuit which operates at 10 GHz as the clock extraction circuit 9. Although the clock extraction process extinguishes clock signals with a frequency around 10 GHz, which disagrees with integer multiples of the fundamental frequency $f_0$ because they cannot sustain a stable optical pulse train, it gradually reinforces a stable pulse oscillation by the clock signal with a frequency coincident with the integer multiple of the fundamental frequency $f_0$ because the modulation frequency f completely coincides with the repetition rate of the optical pulse train. In the course of repeating this process, only a particular clock signal remains around 10 GHz which is initially noisy but whose frequency coincides with the integer multiple of the fundamental frequency. In other words, only one clock signal grows to drive the optical modulator 6, thus achieving harmonic mode-locking at 10 GHz. The conventional technique is called harmonic and regenerative mode-locking.

In the conventional harmonically and regeneratively mode-locked laser pulse oscillator, even if the repetition rate fluctuates because of the cavity length variations due to a temperature change or the like, the repetition rate of the optical pulse train does not deviate from the modulation frequency. This is because the modulation is always carried out by the clock signal locked by itself to the repetition rate of the output optical pulse train. This enables a stable optical pulse train with a high repetition rate to be generated over a long time period without inducing degradation of the waveform of the optical pulses due to a temperature change or the like.

The conventional laser pulse oscillator as shown in FIG. 1, however, has a problem to be solved in that although it can generate a stable optical pulse train over a long period of time, the repetition rate of the optical pulses slightly varies owing to fluctuation in the length of the cavity, and hence the repetition-rate frequency cannot be kept at a fixed value. In addition, there is another problem to be solved in that the repetition-rate frequency of the laser pulse oscillator cannot be locked to an external signal because the laser pulse oscillator oscillates by itself.

The problems will be explained in more detail. In the conventional harmonically and regeneratively mode-locked laser pulse oscillator, the cavity length varies owing to change in the temperature or change in the laser cavity, resulting in fluctuations of the fundamental cavity mode. The modulation frequency driving the optical modulator automatically follows variation in the cavity length thereby enabling a stable pulse oscillation over a long period of time. The repetition-rate frequency of the optical pulses, however, slightly varies in such a manner that the repetition-rate frequency reduces with an increase in the cavity length, and increases with an increase in cavity length. For example, when L=200 m and f=10 GHz, the cavity length varies by 20 $\mu$m for each variation of 0.01° C. in the cavity temperature, resulting in 1 kHz variation in the repetition rate frequency.

Figure 2:
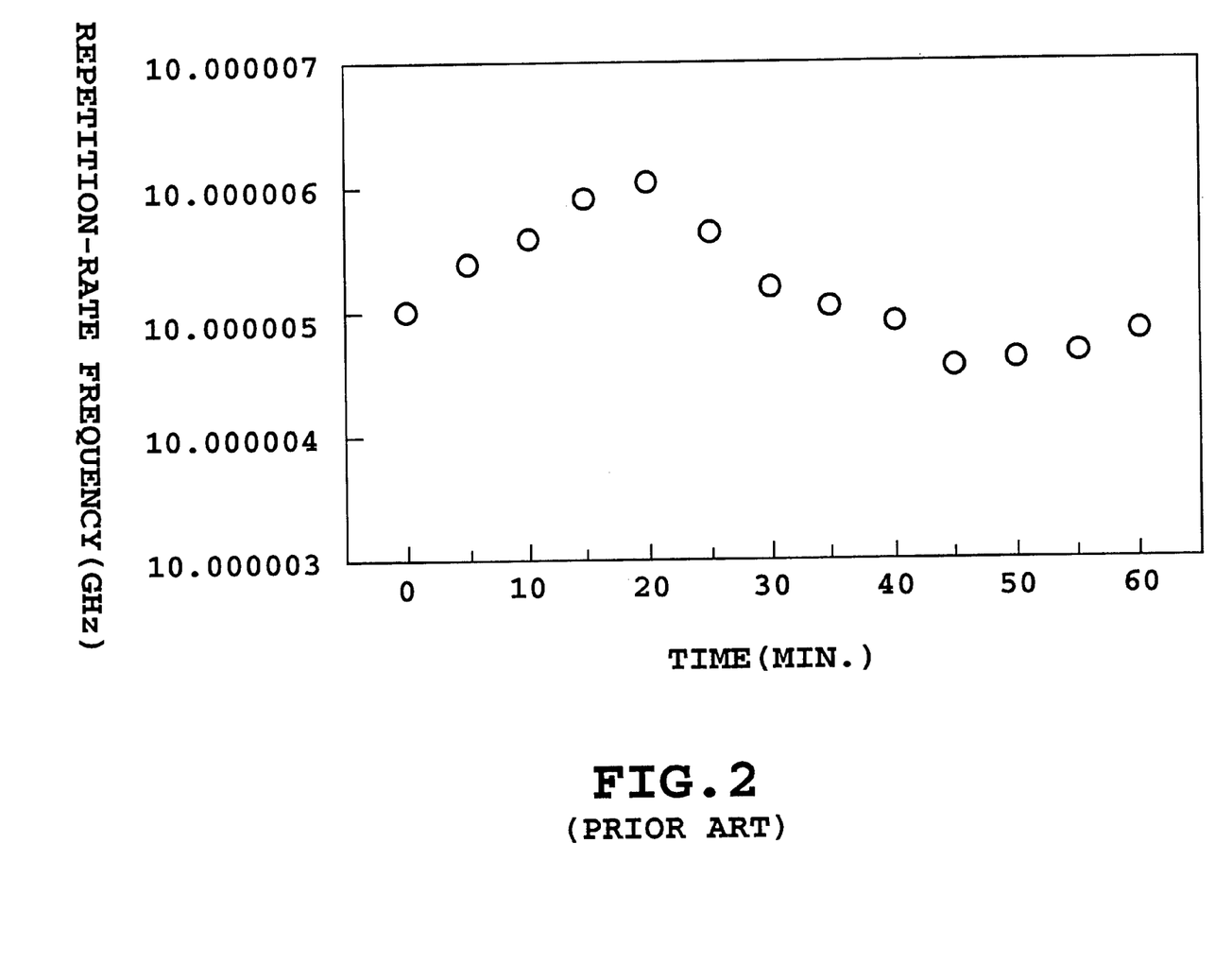
FIG. 2 is a graph illustrating the variations in the repetition rate frequency of an optical pulse train in the conventional laser pulse oscillator as shown in FIG. 1.

FIG. 2 shows an example of frequency fluctuations in the conventional laser pulse oscillator with time. As seen from FIG. 2, the frequency fluctuates at random with time in accordance with a variation in cavity length. In addition, since the laser pulse oscillator oscillates in a self-sustained mode at the modulation frequency determined by a variation in cavity length in this state, the repetition-rate frequency cannot be locked to the external signal.

As described above, although the conventional technique can generate a stable optical pulse train with a high repetition rate, the repetition rate frequency of the optical pulses fluctuates, and it is difficult to generate an optical pulse train locked to the external signal at a fixed frequency.

To solve the problem in that the repetition rate frequency fluctuates with time because the laser pulse oscillator as shown in FIG. 1 oscillates in a self-sustained mode, a laser pulse oscillator applying an offset locking method is disclosed in Japanese laid-open Patent Application No. 139536/1997 or A Repetition-Rate Stabilized and Tunable, Regeneratively Mode-Locked Fiber Laser Using an Offset-Locking Technique, Jpn. J. Appl. Phys. Vol. 35 (1996) pp. L691–L694 Part 2, 6A, Jun. 1, 1996. This method detects the frequency difference between an external signal and the laser clock signal, and converts the frequency difference into a voltage used as a reference voltage for applying offset.

Figure 3:
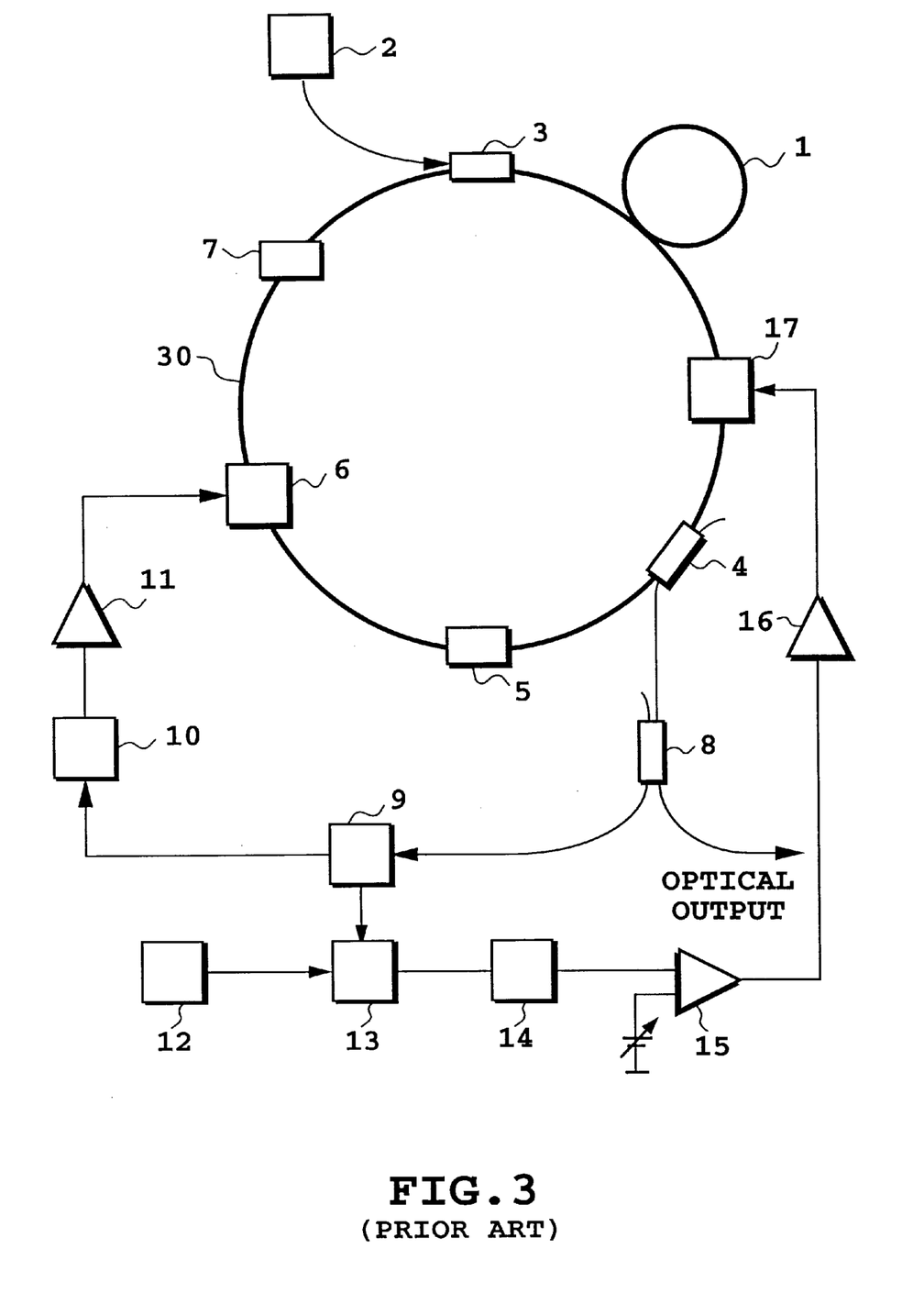
FIG. 3 is a block diagram showing another setup of a conventional laser pulse oscillator.

FIG. 3 shows the setup of the laser pulse oscillator. In FIG. 3, the laser pulse oscillator comprises the rare-earth doped optical fiber 1, the pumping light source 2 for pumping the rare-earth doped optical fiber 1, the optical coupler 3 for coupling the pumping light to the rare-earth doped optical fiber 1, the optical coupler 4 for extracting the output, the optical isolator 5 for confining the traveling direction of the light to one direction, the optical modulator 6, the optical filter 7, the optical coupler 8, the clock extraction circuit 9, the phase shifter 10, the electric amplifier 11, an electric amplifier 16, an external signal generator (synthesizer) 12, a frequency difference detector 13, a frequency-to-voltage converter 14, a differential amplifier 15, a piezoelectric transducer (PZT fiber stretcher) 17, and the optical fiber loop 30 linking the elements 1, 3, 4, 5, 6, 7 and 17 to constitute the laser cavity. Pumping the rare-earth doped optical fiber 1 by the pumping light source 2 through the optical coupler 3 causes continuous wave light to be oscillated in the forward direction of the optical isolator 5 within the transmission band of the optical filter 7. The laser output is extracted through the optical coupler 4 and split by the optical coupler 8 so that a fragment of the laser output is input to the clock extraction circuit 9 including a photo detector, a narrow-band electric filter and an electric amplifier. The clock extraction circuit 9 extracts from the fragment of the laser output a sinusoidal clock signal with a particular frequency. The clock signal undergoes phase adjustment through the phase shifter 10, is amplified by the electric amplifier 11, and applied to the optical modulator 6. As a result, the regenerative mode-locking is achieved, generating an optical pulse train. Thus, the intensity modulation of the light is carried out in the cavity at a frequency locked to the clock signal. Since the modulation signal is derived from the light emitted from the laser, the light is always optimally modulated, and a stable pulse oscillation is sustained over a long time.

The stabilization of the repetition rate frequency in the laser pulse oscillator as shown in FIG. 3 will be described. Receiving the clock signal from the clock extraction circuit 9 and the output of the synthesizer 12 with a fixed frequency, the frequency difference detector 13 detects the frequency difference between the two input signals. Then, the frequency-to-voltage converter 14 generates a voltage V corresponding to the frequency difference $\Delta f=|f_1-f_2|$, where $f_1$ is the frequency of the clock signal and $f_2$ is the frequency of the external signal, so that the offset is applied using the voltage V. More specifically, as the laser repetition rate frequency $f_1$ reduces, $\Delta f$ reduces and the voltage V drops, whereas as $f_1$ increases, $\Delta f$ increases and the voltage V rises. The differential amplifier 15, receiving the voltage V(t) corresponding to $|f_1-f_2|$ at its first input and a reference dc voltage $V_{ref}$ at its second input, amplifies the difference $\Delta V(t)(=V(t)-V_{ref})$ between the two inputs. Estimating the relationship between the extension and contraction of the piezoelectric transducer (PZT fiber stretcher) 17 and the applied voltage in advance enables the sign of a control voltage signal to be adjusted so that $f_1$ is reduced when it increases and $\Delta V(t)$ becomes positive. The amplified $\Delta V(t)$ is applied to the piezoelectric transducer 17 through the electric amplifier 16 to perform negative feedback for automatic control. When $f_1$ reduces, the negative feedback is automatically applied to increase $f_1$. Thus, the feedback circuit sets the laser repetition rate frequency at the frequency shifted by an amount of $\Delta f$ from that of the external signal.

According to the laser pulse oscillator as shown in FIG. 3, the laser repetition rate frequency can be set at the frequency shifted by the predetermined frequency difference from that of the external signal. The offset locking method, however, cannot equalize the laser repetition rate frequency to that of the external signal. As a result, it cannot generate an optical pulse train locked to the external signal.

SUMMARY OF THE INVENTION

The present invention is implemented in view of the foregoing problems. It is therefore an object of the present invention to provide a laser pulse oscillator which can lock the repetition rate frequency of the optical pulses to an external signal, and generate an optical pulse train with a high repetition rate of a fixed frequency which is stable over a long time period.

To achieve this, the present invention varies by the use of a phase-locked loop the cavity length in accordance with the fluctuations of the repetition rate frequency in a laser which fluctuates at random.

In a first aspect of the present invention, there is provided a laser pulse oscillator comprising:

a laser cavity composed of an optical fiber loop including an optical amplifier;

means for extracting an electric clock signal corresponding to a high-order integer multiple of a fundamental frequency determined by a cavity length of the optical fiber loop by picking up a fragment of an output from the laser cavity;

an optical modulator disposed in the laser cavity;

first drive means for driving the optical modulator with the clock signal so that the optical modulator oscillates a laser pulse train in a harmonically and regeneratively mode-locked fashion;

phase difference detection means for detecting a phase difference between the clock signal and an external signal whose frequency is fixed;

cavity length control means for controlling the cavity length such that a repetition rate frequency of the laser pulse oscillation is locked to the external signal; and second drive means for driving the cavity length control means by a signal representative of the phase difference detected by the phase difference detection means, the second drive means constituting a phase-locked loop.

Here, the cavity length control means may comprise an optical fiber stretcher constructed by winding around a piezoelectric transducer the optical fiber in the laser cavity, the fiber stretcher varying its optical fiber length with a voltage applied thereto.

The laser pulse oscillator may further comprise a synthesizer for generating a reference signal, and a phase shifter for shifting a phase of the reference signal, wherein an output of the phase shifter is used as the external signal.

The second drive means may comprise a bandpass filter which receives the phase difference signal detected by the phase difference detection means and allows only a frequency component corresponding to a difference between a frequency of the clock signal and the frequency of the external signal to pass through the bandpass filter, and an amplifier for amplifying an output of the bandpass filter and supplying its output to the cavity length control means.

In a second aspect of the present invention, there is provided a laser pulse oscillator comprising:

a light source for generating pumping light;

a laser cavity composed of an optical fiber loop including a rare-earth doped optical fiber pumped by the pumping light;

a clock extraction circuit for extracting an electric clock signal corresponding to a high-order integer multiple of a fundamental frequency determined by a cavity length of the optical fiber by picking up a fragment of an output from the laser cavity;

an optical modulator disposed in the optical fiber cavity;

a first amplifier for driving the optical modulator with the clock signal so that the optical modulator oscillates a laser pulse train in a harmonically and regeneratively mode-locked fashion;

a phase comparator for detecting a phase difference between the clock signal and an external signal whose frequency is fixed;

a PZT optical fiber stretcher for controlling the cavity length such that a repetition rate frequency of the laser pulse oscillation is locked to the external signal; and a second amplifier for driving the optical fiber stretcher by a signal representative of the phase difference detected by the phase comparator.

Here, the PZT optical fiber stretcher may be constructed by winding the optical fiber in the laser cavity around a PZT.

The laser pulse oscillator may further comprise a bandpass filter which receives the phase difference signal detected by the phase comparator and allows only a frequency component corresponding to a difference between a frequency of the clock signal and the frequency of the external signal to pass through the bandpass filter, wherein the second amplifier amplifies an output of the bandpass filter and supplies its output to the PZT optical fiber stretcher.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

Embodiment 1

Figure 4:
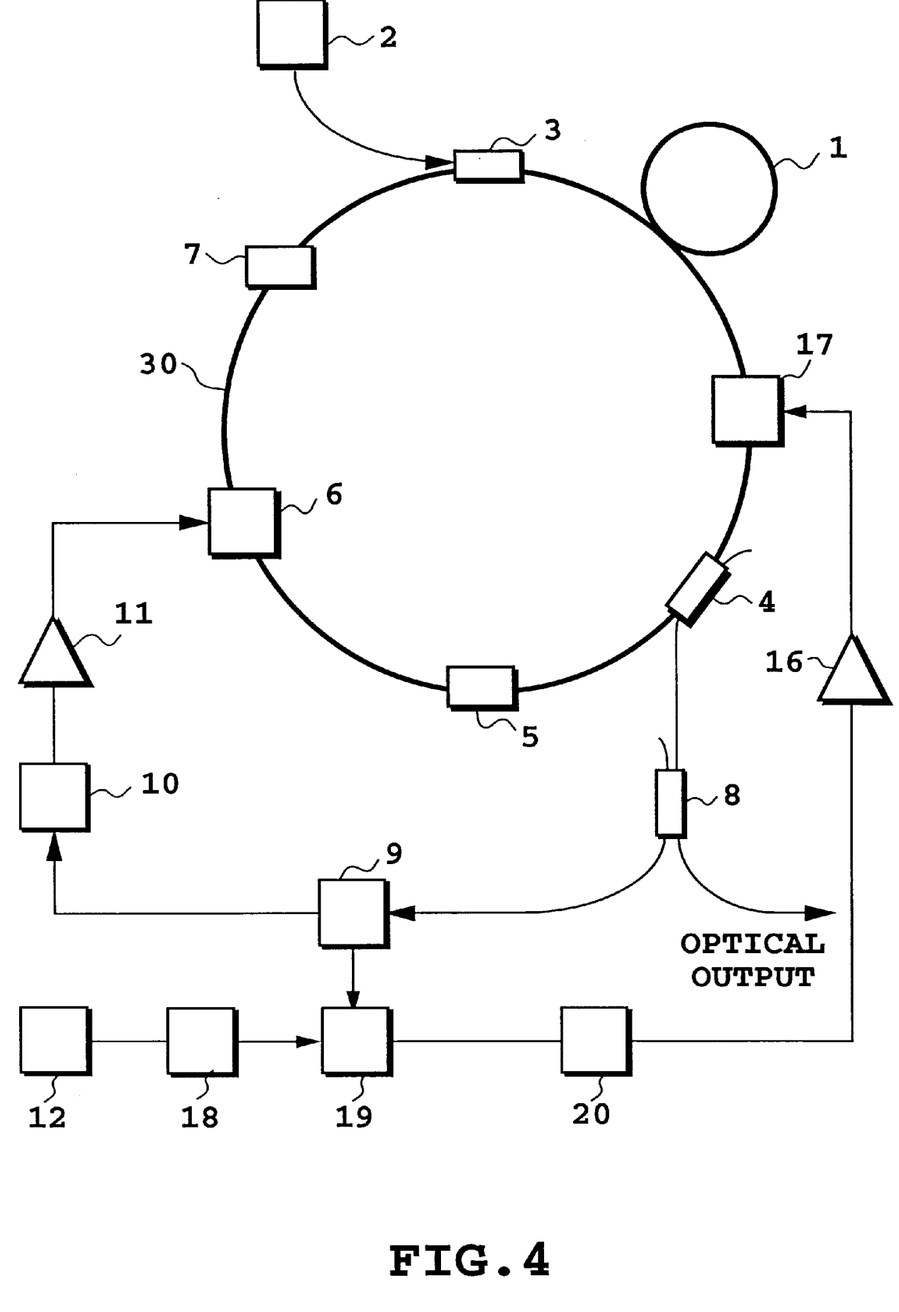
FIG. 4 is a block diagram showing a setup of a laser pulse oscillator in accordance with the present invention.

FIG. 4 shows an embodiment of the laser pulse oscillator in accordance with the present invention. In FIG. 4, the laser pulse oscillator comprises the rare-earth doped optical fiber 1, the pumping light source 2 for pumping the rare-earth doped optical fiber 1, the optical coupler 3 for coupling the pumping light fed from the pumping light source 2 to the rare-earth doped optical fiber 1, the optical coupler 4 for extracting the output light from the optical fiber 1, the optical isolator 5 for confining the traveling direction of the light through the optical fiber 1 to one direction, the optical modulator 6, the optical filter 7, the optical coupler 8 for receiving the split light from the optical coupler 4 and further splitting it into feedback light and output light, the clock extraction circuit 9 for extracting from the feedback light the clock signal in the form of an electric signal, the phase shifter 10 for shifting the phase of the clock signal extracted by the clock extraction circuit 9, the electric amplifier 11 for amplifying the output of the phase shifter 10 and producing a modulation signal to the optical modulator 6, the synthesizer (reference signal generator) 12, a phase shifter 18, a phase comparator 19, an electric filter 20, the electric amplifier 16, the piezoelectric transducer (fiber stretcher) 17, and the optical fiber loop 30 linking the elements 1, 3, 4, 5, 6, 7 and 17 to constitute the laser cavity. Although the foregoing components 1–12, 16 and 17 are substantially the same as those shown in FIG. 3, the components 18–20 are those involved only in the present invention.

The reference signal (external signal) fed from the synthesizer 12 is supplied to the phase comparator 19 through the phase shifter 18. The phase comparator 19 is also supplied with the clock signal from the clock extraction circuit 9, and feeds the phase compared output signal to the electric amplifier 16 through the electric filter 20. The piezoelectric transducer 17 is controlled by the output from the electric amplifier 16.

If an erbium doped optical fiber is used as the rare-earth doped optical fiber 1, the oscillation wavelength of the laser falls in the 1.5 $\mu$m band. Accordingly, a semiconductor laser can be applied as the pumping light source 2. As the optical modulator 6, it is possible to employ any one of a Mach-Zehnder type intensity modulator composed of lithium niobate, an electroabsorption optical modulator, and a semiconductor laser modulator.

The generation of the optical pulse train with a high repetition rate by the laser pulse oscillator in accordance with the present invention will now be described.

Pumping the rare-earth doped optical fiber 1 by the pumping light source 2 through the optical coupler 3 causes continuous wave light to be oscillated in the forward direction of the optical isolator 5 within the transmission band of the optical filter 7 in the optical fiber loop 30. The laser output is extracted through the optical coupler 4 and split by the optical coupler 8 so that its fragment is input to the clock extraction circuit 9 including a photo detector, a narrow-band electric filter and an electric amplifier. The clock extraction circuit 9 extracts from the laser output a sinusoidal clock signal with a particular frequency. The clock signal undergoes phase adjustment through the phase shifter 10, amplified by the electric amplifier 11, and then applied to the optical modulator 6. Thus, the intensity modulation of the light is carried out in the cavity at a frequency locked to the clock signal. Since the modulation signal is derived from the light emitted from the laser, the light is always optimally modulated and a stable pulse oscillation is sustained over a long time. The repetition rate of the output pulses can be varied by changing the frequency of the clock signal extracted by the clock extraction circuit 9.

Next, the stabilization (phase locking) of the repetition rate frequency in the present invention will be described.

The phase comparator 19 is supplied with the clock signal $y_1(t)$ output from the clock extraction circuit 9 and an electric signal $y_2(t)$ output from the synthesizer 12 and phase shifted by the phase shifter 18 by an amount $\phi_2$. Here, let us express the clock signal as $$y_1(t) = a \sin(2\pi f_1 t + \phi_1) \tag{a1}$$

and the reference signal from the synthesizer 12 as $$y_2(t) = b \sin(2\pi f_2 t + \phi_2) \tag{a2}$$

where a and b are amplitudes of the clock signal and the reference signal, $\phi_1$ and $\phi_2$ are phases of the clock signal and the reference signal, $f_1$ and $f_2$ are frequencies of the clock signal and the synthesizer, respectively, and t is time. The output signal $y_3(t)$ of the phase comparator 19 is given by the multiplication of the two signals and expressed as follows:

$$\begin{aligned} y_3(t) &= k y_1(t) y_2(t) \\ &= kab\cos(2\pi(f_1 - f_2)t + \phi_1 - \phi_2)) + \\ &\quad kab\cos(2\pi(f_1 + f_2)t + \phi_1 + \phi_2)) \end{aligned} \tag{1}$$

where k is a conversion constant. The output of the phase comparator 19 consists of a term including the difference $(f_1-f_2)$ between the frequency $f_1$ of the clock signal and the frequency $f_2$ of the reference signal fed from the synthesizer 12, and a term including their sum $(f_1+f_2)$. Setting the phase $\phi_0$ such that $$\phi_2 = \phi_1 - \pi/2 \tag{2}$$

is satisfied by the phase shifter 18, the output $y_3(t)$ of the phase comparator 19 is given by $$y_3(t) = kab\sin(2\pi(f_1 - f_2)t) + kab\cos(2\pi(f_1 + f_2)t + 2\phi_1 - \pi/2)) \tag{3}$$

The electric filter 20, a bandpass electric filter, is set such that only the frequency difference component $(f_1-f_2)$ can pass its passband. Therefore, the harmonic component including the sum frequency $(f_1+f_2)$ is removed by the electric filter 20, and equation (3) is reduced to $$\begin{aligned} y_3(t) &= kab\sin(2\pi(f_1 - f_2)t) \\ &= c\sin(2\pi\Delta f_t) \end{aligned} \tag{4}$$

where $c=kab$ and $\Delta f=f_1-f_2$.

If $\Delta f=0$, that is, if the laser pulse oscillation is in the neighborhood of the locked state, equation (4) is further reduced to $$y_3(t) = 2\pi c \, \Delta f_t \tag{5}$$

It means that the output signal of the phase comparator 19 is proportional to the frequency difference $\Delta f$ between the clock signal and the synthesizer. Since the frequency $f_2$ of the synthesizer 12 is fixed, the output $y_3(t)$ of the phase comparator 19 becomes a voltage proportional to the fluctuation of the frequency of the clock signal $f_1$, that is, of the repetition rate frequency $f_1$ of the laser pulse oscillator.

Consider the case where the laser pulse oscillator shown in FIG. 4 starts to oscillate at the repetition rate frequency f in the regenerative mode-locking method. The frequency of the reference signal (external signal) fed from the synthesizer 12 is initially set at the repetition rate frequency of the laser. The frequency difference $\Delta f$ becomes positive if the cavity length is reduced by the temperature drop in the cavity, and hence the repetition rate frequency $f_1$ of the laser increases beyond the initially set repetition rate frequency f. In contrast, the frequency difference $\Delta f$ becomes negative if the cavity length is increased by the temperature rise in the cavity, and hence the repetition rate frequency $f_1$ of the laser decreases below the initially set repetition rate frequency f.

In view of this, by estimating the relationship between the extension and contraction of the piezoelectric transducer 17 and the applied voltage fed from the electric amplifier 16 in advance, the sign of a control voltage signal is adjusted. The control voltage signal is supplied to the piezoelectric transducer 17 through the electric amplifier 16 such that the repetition rate frequency $f_1$ of the laser is reduced when $f_1$ is increased and hence $\Delta f$ becomes positive in accordance with equation (5). In contrast, when the repetition rate frequency $f_1$ of the laser decreases and hence $\Delta f$ becomes negative, the control voltage signal is supplied to the piezoelectric transducer 17 through the electric amplifier 16 so that the frequency $f_1$ increases. With the negative feedback continuously applied through the piezoelectric transducer 17 in this way, the control loop is stabilized in the neighborhood of $\Delta f \approx 0$. In other words, the phase-locked loop operates such that the oscillation frequency $f_1$ of the laser is fixed to the frequency $f_2$ of the synthesizer 12, which means that the repetition rate frequency $f_1$ of the laser coincides with the frequency $f_2$ of the external signal fed from the synthesizer 12 through the phase shifter 18, thereby becomes constant.

According to the present invention, providing the phase-locked loop enables the cavity length to adjust according to the variation in the repetition rate frequency of the optical pulses. Accordingly, the cavity length is automatically kept constant so that the laser pulse oscillator operates at the repetition rate frequency $f_1$ locked to the external signal fed from the synthesizer 12. As a result, the frequency $f_1$ is kept constant for a long time period regardless of the temperature variations of the frequency $f_1$.

Figure 5:
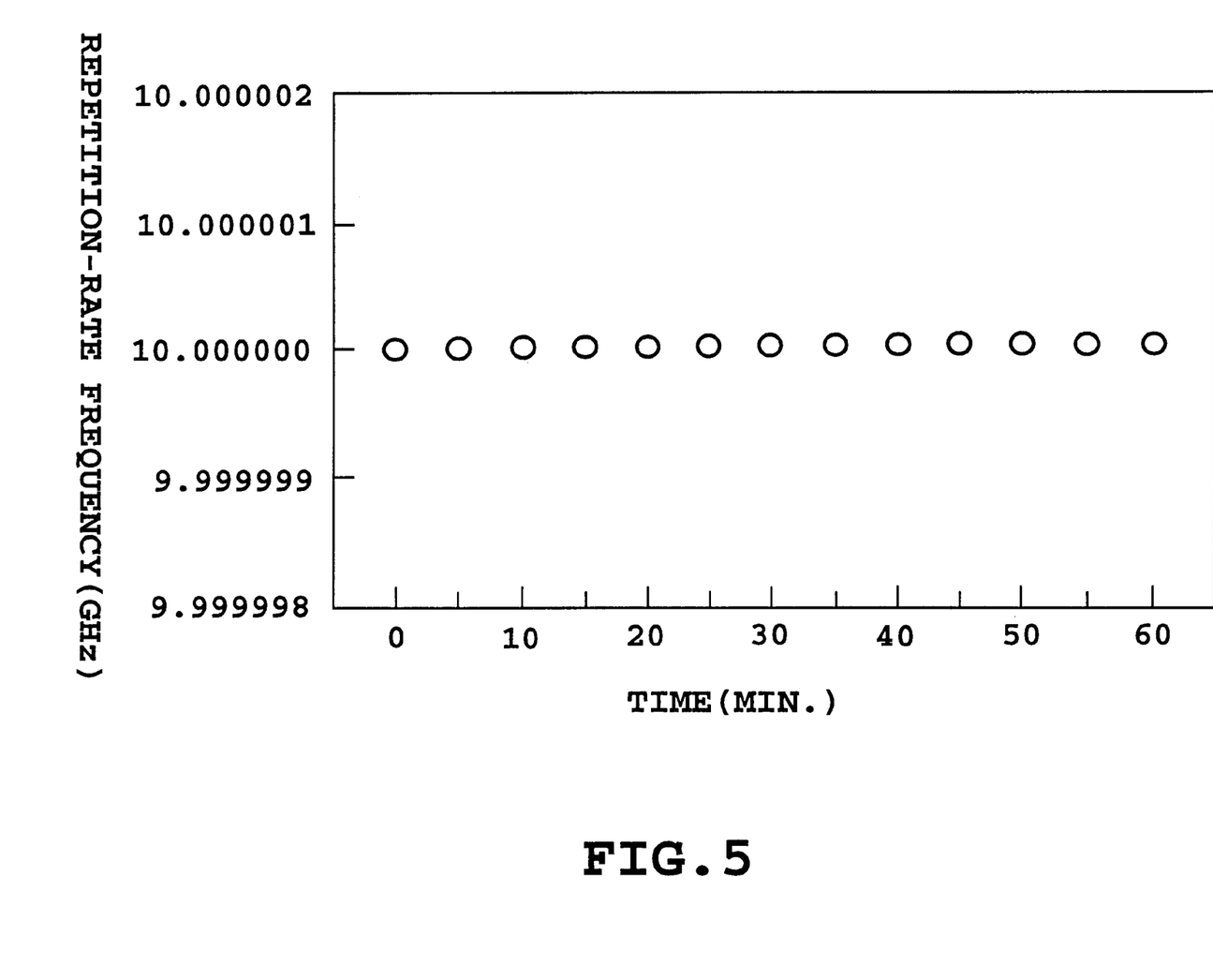
FIG. 5 is a graph illustrating variations of the repetition rate frequency of an optical pulse train in the laser pulse oscillator in accordance with the present invention.

FIG. 5 illustrates an example of the frequency variation when the synthesizer 12 is set at 10 GHz. Unlike the conventional laser pulse oscillator, the frequency does not fluctuate with time in spite of the temperature change in the cavity, and is kept at a fixed value locked to the external signal from the synthesizer.

The laser pulse oscillator in accordance with the present invention can generate the optical pulse train with a high repetition rate locked to the external signal, which was impossible with the conventional technique.

Figure 6:
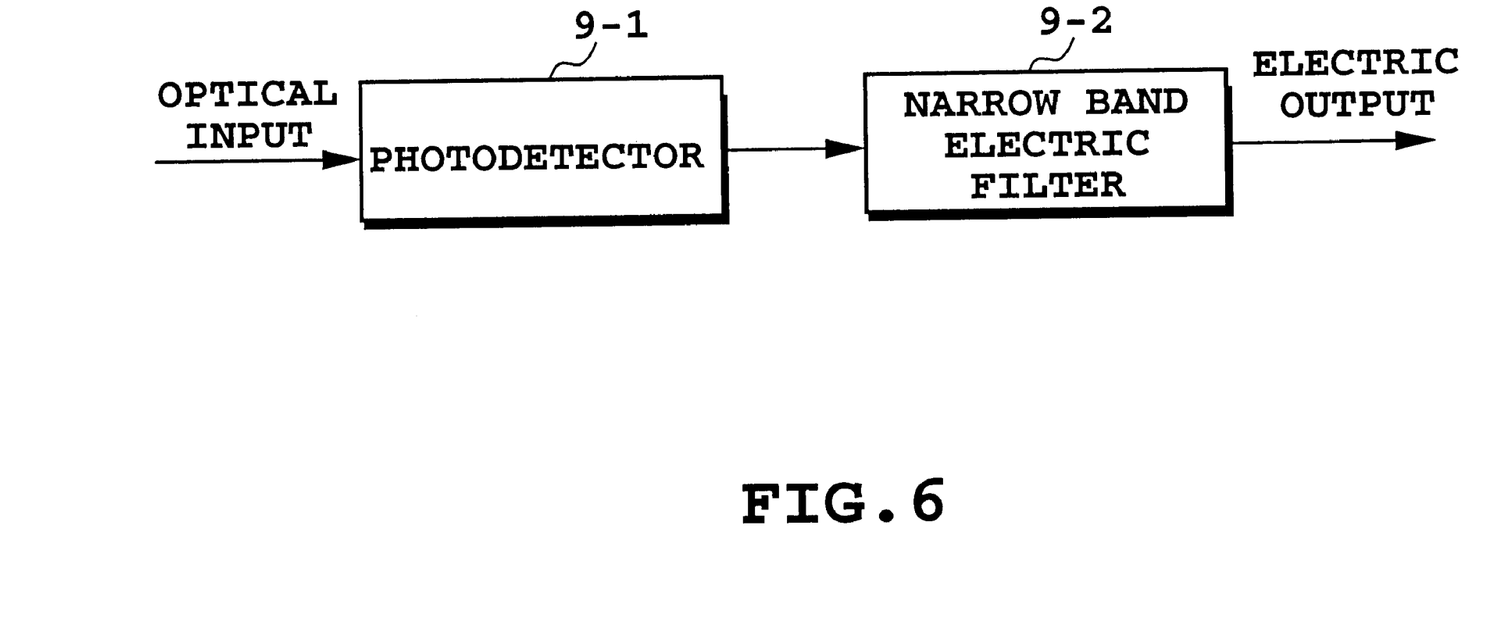
FIG. 6 is a block diagram showing an example of the clock extraction circuit shown in FIG. 4.
Figure 7:
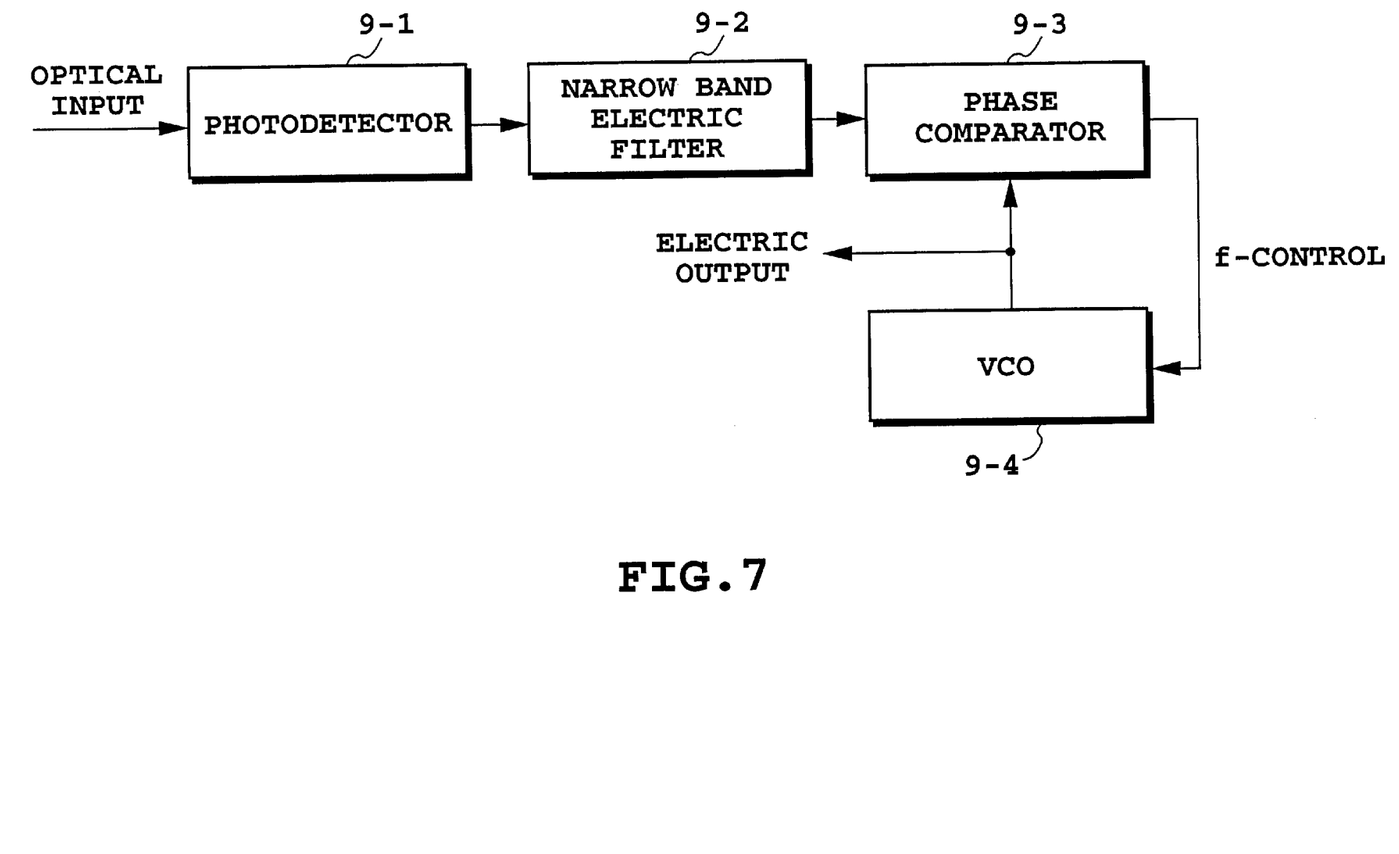
FIG. 7 is a block diagram showing another example of the clock extraction circuit shown in FIG. 4.

FIG. 6 shows an example of the clock extraction circuit 9 as shown in FIG. 4, and FIG. 7 shows another example thereof. In FIG. 6, the clock extraction circuit 9 is configured by a photodetector 9-1 and a narrow band electric filter 9-2. In the example of FIG. 7, a phase comparator 9-3 and a voltage controlled oscillator 9-4 are further added to constitute a phase-locked loop for acquiring the clock output (electric signal).

As described above, according to the laser pulse oscillator in accordance with the present invention which generates an optical pulse train with a high repetition rate by the harmonic and regenerative mode-locking, the phase difference is detected between the external signal whose frequency is kept constant and the clock signal which drives an optical modulator, and the phase-locked loop automatically controls the cavity length in response to the detected phase difference so that the repetition rate frequency of the laser pulse oscillator phase-locks to the external signal. This makes it possible to generate a stable optical pulse train with a high repetition rate with its frequency kept constant over a long time period.

In addition, although the laser pulse oscillator applying the offset locking method as shown in FIG. 3 converts the frequency to the voltage signal using the frequency-to-voltage converter and the differential amplifier to detect the error signal, the present invention detects the error signal by the phase comparison. This has the advantage of obviating a complicated circuit such as the conventional example shown in FIG. 3, and improving cost effectiveness.

The present invention relates to a technique for generating an ultra-short pulse train for ultrafast optical communications, and can be applied to a light source for ultrafast time analysis or for E–O sampling.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A laser pulse oscillator comprising:
   a laser cavity composed of an optical fiber loop;
   means for extracting an electric clock signal corresponding to a high-order integer multiple of a fundamental frequency determined by a cavity length of said optical fiber loop by picking up a fragment of an output from said laser cavity;
   an optical modulator disposed in said laser cavity;
   first drive means for driving said optical modulator with said clock signal so that said optical modulator oscillates a laser pulse train in a harmonically and regeneratively mode-locked fashion;
   phase difference detection means for detecting a phase difference between said clock signal and an external signal whose frequency is fixed;
   cavity length control means for controlling said cavity length such that a repetition rate frequency of said laser pulse oscillation is locked to said external signal; and
   second drive means for driving said cavity length control means by a signal representative of said phase difference detected by said phase difference detection means, said second drive means constituting a phase-locked loop.

2. The laser pulse oscillator as claimed in claim 1, wherein said cavity length control means comprises an optical fiber stretcher constructed by winding around a piezoelectric transducer the optical fiber in said laser cavity, said fiber stretcher varying its optical fiber length with a voltage applied thereto.

3. The laser pulse oscillator as claimed in claim 1, further comprising a synthesizer for generating a reference signal, and a phase shifter for shifting a phase of said reference signal, wherein an output of said phase shifter is used as said external signal.

4. The laser pulse oscillator as claimed in claim 1, wherein said second drive means comprises a bandpass filter which receives said phase difference signal detected by said phase difference detection means and allows only a frequency component corresponding to a difference between a frequency of said clock signal and the frequency of said external signal to pass through said bandpass filter, and an amplifier for amplifying an output of said bandpass filter and supplying its output to said cavity length control means.

5. The laser pulse oscillator as claimed in claim 2, further comprising a synthesizer for generating a reference signal, and a phase shifter for shifting a phase of said reference signal, wherein an output of said phase shifter is used as said external signal.

6. The laser pulse oscillator as claimed in claim 2, wherein said second drive means comprises a bandpass filter which receives said phase difference signal detected by said phase difference detection means and allows only a frequency component corresponding to a difference between a frequency of said clock signal and the frequency of said external signal to pass through said bandpass filter, and an amplifier for amplifying an output of said bandpass filter and supplying its output to said cavity length control means.

7. The laser pulse oscillator as claimed in claim 3, wherein said second drive means comprises a bandpass filter which receives said phase difference signal detected by said phase difference detection means and allows only a frequency component corresponding to a difference between a frequency of said clock signal and the frequency of said external signal to pass through said bandpass filter, and an amplifier for amplifying an output of said bandpass filter and supplying its output to said cavity length control means.

8. A laser pulse oscillator comprising:
   a light source for generating pumping light;
   a laser cavity composed of an optical fiber loop including a rare-earth doped optical fiber pumped by said pumping light;
   a clock extraction circuit for extracting an electric clock signal corresponding to a high-order integer multiple of a fundamental frequency determined by a cavity length of said optical fiber by picking up a fragment of an output from said laser cavity;
   an optical modulator disposed in said optical fiber cavity;
   a first amplifier for driving said optical modulator with said clock signal so that said optical modulator oscillates a laser pulse train in a harmonically and regeneratively mode-locked fashion;
   a phase comparator for detecting a phase difference between said clock signal and an external signal whose frequency is fixed;
   a PZT optical fiber stretcher for controlling said cavity length such that a repetition rate frequency of said laser pulse oscillation is locked to said external signal; and a second amplifier for driving said optical fiber stretcher by a signal representative of said phase difference detected by said phase comparator.

9. The laser pulse oscillator as claimed in claim 8, wherein said PZT optical fiber stretcher is constructed by winding the optical fiber in said laser cavity around a PZT.

10. The laser pulse oscillator as claimed in claim 8, further comprising a synthesizer for generating a reference signal, and a phase shifter for shifting a phase of said reference signal, wherein an output of said phase shifter is used as said external signal.

11. The laser pulse oscillator as claimed in claim 8, further comprising a bandpass filter which receives said phase difference signal detected by said phase comparator and allows only a frequency component corresponding to a difference between a frequency of said clock signal and the frequency of said external signal to pass through said bandpass filter, wherein said second amplifier amplifies an output of said bandpass filter and supplies its output to said PZT optical fiber stretcher.

12. The laser pulse oscillator as claimed in claim 9, further comprising a synthesizer for generating a reference signal, and a phase shifter for shifting a phase of said reference signal, wherein an output of said phase shifter is used as said external signal.

13. The laser pulse oscillator as claimed in claim 9, further comprising a bandpass filter which receives said phase difference signal detected by said phase comparator and allows only a frequency component corresponding to a difference between a frequency of said clock signal and the frequency of said external signal to pass through said bandpass filter, wherein said second amplifier amplifies an output of said bandpass filter and supplies its output to said PZT optical fiber stretcher.

14. The laser pulse oscillator as claimed in claim 10, further comprising a bandpass filter which receives said phase difference signal detected by said phase comparator and allows only a frequency component corresponding to a difference between a frequency of said clock signal and the frequency of said external signal to pass through said bandpass filter, wherein said second amplifier amplifies an output of said bandpass filter and supplies its output to said PZT optical fiber stretcher.

* * * * *